United States Patent
Engheta et al.

(10) Patent No.: US 8,116,009 B2
(45) Date of Patent: Feb. 14, 2012

(54) FAR-FIELD SUB-DIFFRACTION OPTICAL LENSES (FASDOL)

(75) Inventors: Nader Engheta, Wayne, PA (US); Alessandro Salandrino, Philadelphia, PA (US); Brian Edwards, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 394 days.

(21) Appl. No.: 12/300,948

(22) PCT Filed: May 16, 2007

(86) PCT No.: PCT/US2007/011685
§ 371 (c)(1),
(2), (4) Date: Jul. 31, 2009

(87) PCT Pub. No.: WO2008/069837
PCT Pub. Date: Jun. 12, 2008

(65) Prior Publication Data
US 2009/0303578 A1    Dec. 10, 2009

Related U.S. Application Data

(60) Provisional application No. 60/801,213, filed on May 16, 2006.

(51) Int. Cl.
*G02B 3/00* (2006.01)
*G02B 5/18* (2006.01)
(52) U.S. Cl. .................... 359/642; 359/558; 359/900
(58) Field of Classification Search .............. 359/342, 359/558, 576, 642, 652, 718, 900
See application file for complete search history.

(56) References Cited

U.S. PATENT DOCUMENTS
6,392,792 B1   5/2002   Naulleau

OTHER PUBLICATIONS

Abbe, E., Schultzes Arch. Mikr. Anat., 9, 413-468 (1873).
Ash, E.A. et al., "Super-resolution Aperture Scanning Microscope," Nature, Jun. 30, 1972, 237, 510-512.
Balmain, K.G. et al., Antennas and Wireless Propagation Letters, 2002, 1, 1, 146-149.
Binnig, G. and Rohrer, H., "Scanning Tunneling Microscopy—From Birth to Adolescence," Nobel lecture, Dec. 8, 1986, IBM Research Division, Zurich Research laboratory, 8803 Rüschlikon, Switzerland, 21 pages.
Born, M. et al., Principles of Optics 7$^{th}$ Edition (Cambridge University Press, Cambridge, 1999).
Durant, S. et al., "Theory of the transmission properties of an optical far-field superlens for imaging beyond the diffraction limit," J. Opt. Soc. Am. B, Nov. 2006, 23(11), 2383-2392.
Engheta, N. et al., "A Positive Future for Double-Negative Metamaterials," IEEE Trans. Microwave Theory and Techniques, Apr. 2005, 53(4), 1535-1556.

(Continued)

*Primary Examiner* — Jack Dinh
(74) *Attorney, Agent, or Firm* — Woodcock Washburn, LLP

(57) ABSTRACT

Far-field sub-diffraction optical lenses "FaSDOLs" comprise an anisotropic crystal having special dispersion characteristics such that it supports diffraction free propagation. An image with subwavelength features on the input surface is transferred through a propagation function to the output surface with effectively no, or minimal, loss in information. These special properties may be exploited in several ways, including but not limited to, magnification of an image at the input surface through the use an oblique cut at the output surface, magnification of an image at the input surface through use of a curved crystalline structure, and more generally near-field optical processing.

55 Claims, 11 Drawing Sheets

OTHER PUBLICATIONS

Feng, S. et al., "Diffraction-suppressed high-resolution imaging through metallodielectric nanofilms," Opt. Express, 2006, 14, 216-221.

Fisher, R.K. et al., "Resonance cones in the field pattern of a short antenna in an anisotropic plasma," Physical Review Letters, May 26, 1969, 22(21), 1093-1095.

Hell, S.W. and Wichmann, J., "Breaking the diffraction resolution limit by stimulated emission: stimulated-emission-depletion fluorescence microscopy," Optics Letters, Jun. 1, 1994, 19(11), 780-782.

Instrument Technology Research Center, "Spherical/Ashperical/V-Groove Microlens Array," Retrieved from URL <http://www.itrc.org.tw/Research/Product/Nano/microlens-e.php> on May 11, 2006.

Jacob, Z. et al., "Optical Hyperlens: Far-Field imaging beyond the diffraction limit," Optics Express, Sep. 4, 2006, 14(18), 8247-8256.

Klar, T.A. et al., "Fluorescence Microscopy with Diffraction Resolution Barrier Broken by Stimulated Emission," Proc. Natl. Acad. Sci. USA, Jul. 18, 2000, 97(15), 8206-8210.

Pendry, J.B., "Perfect cylindrical lenses," Optics Express, Apr. 7, 2003, 11(7), 755-760.

Ramakrishna, S.A. et al., "Imaging the near field," Journal of Modern Optics, 2003, 50(9), 1419-1430.

Ramakrishna, S.A. et al., "Removal of absorption and increase in resolution in a near-field lens via optical gain," Physical Review B, 2003, 67, 201101-1 to 201101-4.

Ruska, E., "The Development of the Electron Microscope and of Electron Microscopy," Nobel lecture, Dec. 8, 1986, 26 pages.

Salandrino, A. et al., "Far-field optical microscopy using metamaterial crystals: Theory and simulations," Physical Review B, 2006, 74, 075103-1 to 075103-5.

Schurig, D. et al., "Sub-diffraction imaging with compensating bilayers," New Journal of Physics, 7, (2005), 162, pp. 1-15.

Smolyaninov, I. et al., "Far-Field Optical Microscopy with a Nanometer-Scale Resolution Based on the In-Plane Image Magnification by Surface Plasmon Polaritons," Physical Review Letters, Feb. 11, 2005, 057401-1 to 057401-4.

Smolyaninov, I.I. et al., "Magnifying Superlens in the Visible Frequency Range," Science, Mar. 23, 2007, 315, 1699-1701, downloaded from www.sciencemag.org on Apr. 19, 2007.

Soukoulis, C.M. et al., "Negative Refractive Index at Optical Wavelengths," Science, Jan. 5, 2007, 315, 47-49.

Synge, E.H., "A Suggested Method for extending Microscopic Resolution into the Ultra-Microscopic Region," Philos. Mag., 1928, 6, 356-362.

Van Oijen, A.M. et al., "Far-field fluorescence microscopy beyond the diffraction limit," J. Opt. Soc. Am. A., Apr. 1999, 16(4), 909-915.

Zernike, F., "How I discovered phase contrast," Nobel lecture, Dec. 11, 1953, 240-246.

Zhaowei Liu et al., "Far-Field Optical Superlens," Nano Letters, 2007, 7(2), 403-408.

Zhaowei Liu et al., "Far-Field Optical-Hyperlens Magnifying Sub-Diffraction-Limited Objects," Science, Mar. 23, 2007, vol. 315, 1686, downloaded from www.sciencemag.org on Mar. 22, 2007.

Zharov, V.P., "Far-field photothermal microscopy beyond the diffraction limit," Optics Letters, Aug. 1, 2003, 28(15), 1314-1316.

PRIOR ART

PRIOR ART

PRIOR ART

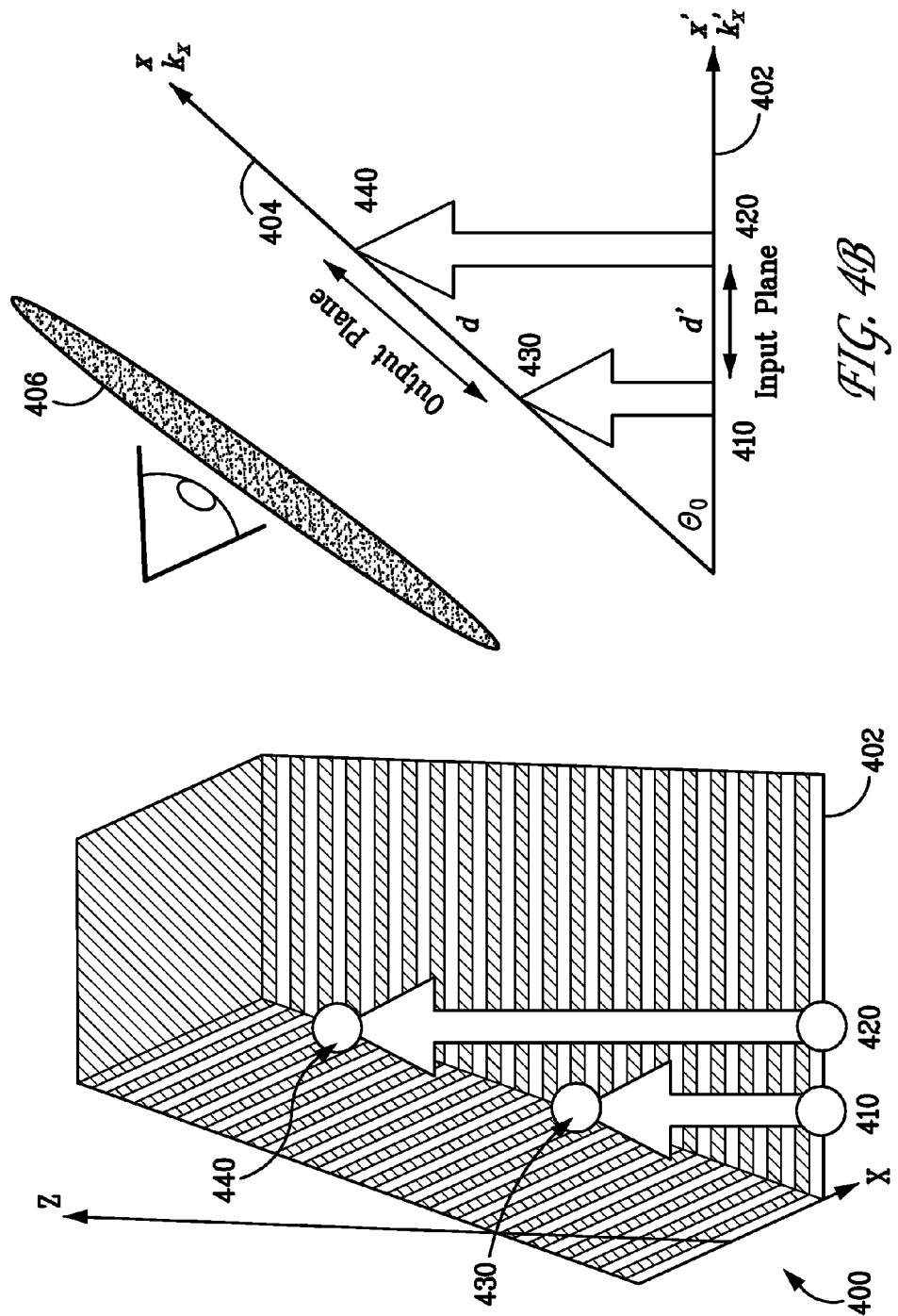

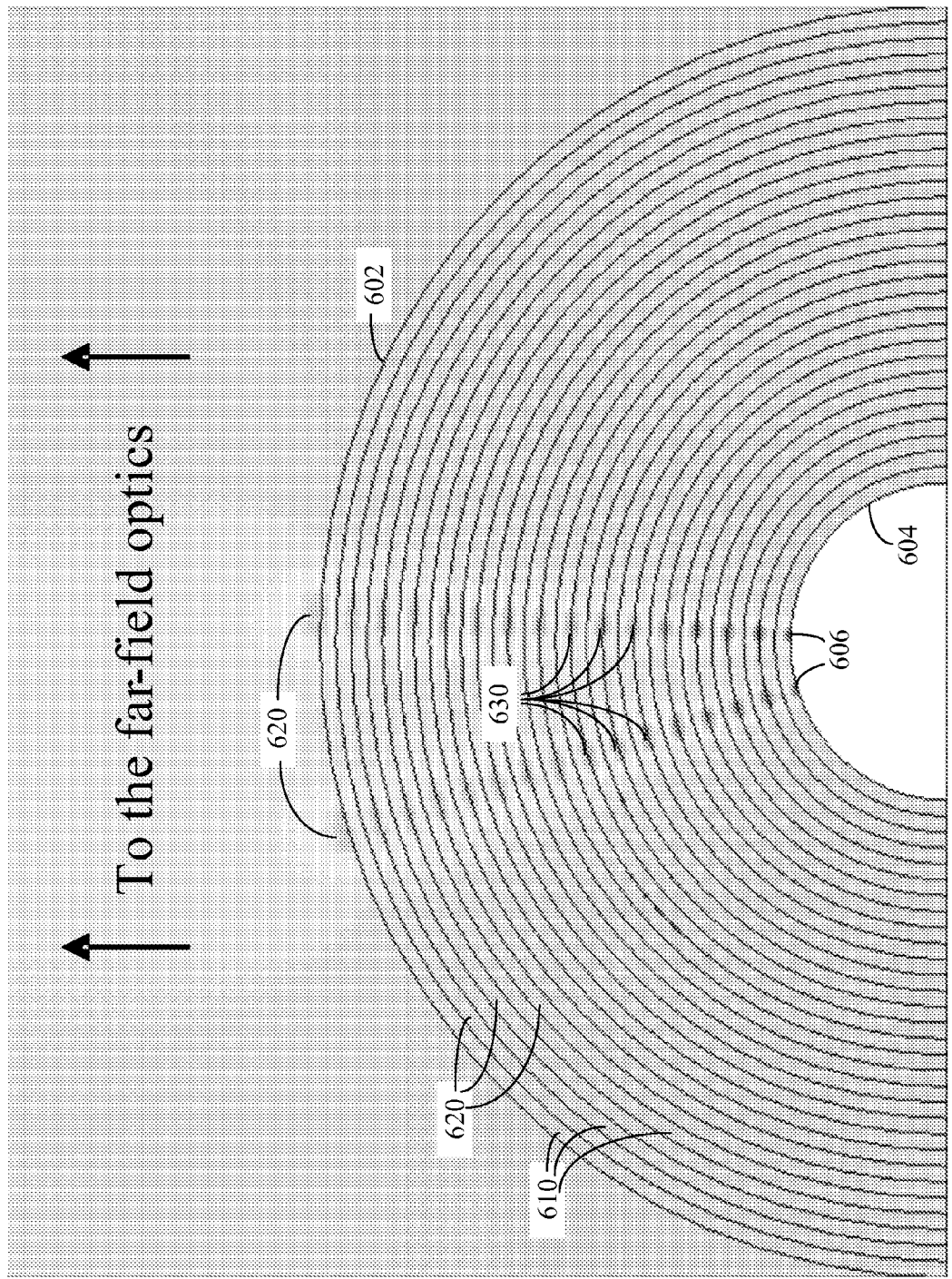

US 8,116,009 B2

FAR-FIELD SUB-DIFFRACTION OPTICAL LENSES (FASDOL)

CROSS-REFERENCE TO RELATED APPLICATIONS

This application is the National Stage of International Application No. PCT/US2007/011685, filed May 16, 2007, which claims the benefit of U.S. Provisional Application No. 60/801,213, filed May 16, 2006, the disclosures of which are incorporated herein by reference in their entireties.

STATEMENT OF GOVERNMENT INTERESTS

The invention was made with U.S. Government support. The Government may have certain rights in the invention under the U.S. Air Force Office of Scientific Research (AFOSR) grant number FA9550-05-1-0442.

FIELD OF THE INVENTION

The disclosed invention is in the field of optics. The disclosed invention is also in the field of materials useful for optics. The disclosed invention is also in the field of sub-diffraction optical microscopy.

BACKGROUND OF THE INVENTION

The lens is the most fundamental component of the optical microscope, which is an important instrument of scientific research in a variety of fields, from biology to surface science, to medicine. Until recently, it has been believed that the resolution of any optical instrument built with conventional lenses is limited by the operating wavelength of the light. Such resolution limitations of conventional far-field optics are well known and arise from the wave nature of light. As a result, light cannot be focused beyond the so-called Abbe-Rayleigh limit using conventional optical lenses composed of a homogeneous isotropic medium (E. A. Ash and G. Nicholls, *Nature* 237, 510-513 (1972); I. I. Smolyaninov, J. Elliot, A. V. Zayats, C. V. Davis, *Phys. Rev. Lett.* 94, 057401 (2005)).

New forms of optical microscopy have been devised to overcome the diffraction resolution limit. An idea by Synge in 1928 (E. H. Synge, *Philos. Mag.* 6, 356-362 (1928)) led eventually to the realization of the first near-field scanning optical microscope (NSOM) in 1972 (E. A. Ash and G. Nicholls, *Nature* 237, 510-513 (1972)), followed by various refinements and variations from the original technique. The common theme to these techniques has been based on collecting the field in very close proximity of the sample by scanning a fiber tip. These new techniques have resulted in much finer resolution beyond the diffraction limitation for an optical instrument and have led to the possibility of resolving details on the 10-100 nm scale.

One of the constraints of NSOM techniques is the need for scanning the sample point by point (or region by region), making the entire procedure relatively slow. Scanning, in principle, prevents NSOM from capturing fast dynamical processes taking place in the sample in real time. In a far-field optical microscope, however, the light scattered or emitted by the sample may be collected by the instrument aperture all at once, making the procedure fast and thus providing the possibility of observing temporally dynamic samples (which is often needed in observing fast dynamic processes in biology and medicine, for example). Far-field optical microscopy, however, uses traditional diffraction-limited optics. Accordingly, there is an urgent need to develop optical microscopy systems and methods that exhibit both high resolution and wide sampling areas.

SUMMARY OF THE INVENTION

The general description and the following detailed description are exemplary and explanatory only and are not restrictive of the invention, as defined in the appended claims. Other aspects of the present invention will be apparent to those skilled in the art in view of the detailed description of the invention as provided herein.

One aspect of the present invention provides far-field sub-diffraction optical lenses (FaSDOL), comprising a one-dimensionally periodic layered metamaterial crystal comprising a plurality of alternating layers comprising layer 1 and layer 2, each of the layers characterized as comprising a layer thickness $d_1$ and $d_2$, and comprising |effective |permittivity $\in_1$ and $\in_2$ at a wavelength $\lambda$, respectively, wherein the metamaterial crystal is characterized as having a unit cell of thickness d, wherein $c_1 = d_1/d$ and $c_2 = d_2/d$ (c1 and c2 are coefficients), wherein d is smaller than the wavelength $\lambda$, and wherein $\in_1$ and $\in_2$ are characterized according to the relationship $\in_2 \cong -(c_1/c_2)\in_1$; an input surface adjacently situated to at least one of the alternating layers of the metamaterial crystal, the input surface capable of receiving an image from a specimen, light source, or both, and the input surface capable of transmitting the image into the metamaterial crystal; and an output surface adjacently situated to at least one of the alternating layers of the metamaterial crystal, the output surface capable of transmitting a magnified image out from the metamaterial crystal.

Another aspect of the present invention provides methods of optically resolving features of an object smaller than the wavelength of light used to image the object, comprising providing a FaSDOL that comprises a one-dimensionally periodic layered metamaterial crystal comprising a plurality of alternating layers comprising layer 1 and layer 2, each of the layers characterized as comprising a layer thickness $d_1$, and $d_2$, and comprising an effective permittivity $\in_1$ and $\in_2$ at a wavelength $\lambda$, respectively, wherein the metamaterial crystal is characterized as having a unit cell of thickness d, wherein $c_1 = d_1/d$ and $c_2 = d_2/d$, wherein d is smaller than the wavelength $\lambda$, and wherein $\in_1$, and $\in_2$ are characterized according to the relationship $\in_2 \cong -(c_1/c_2)\in_1$; an input surface adjacently situated to at least one of the alternating layers of the metamaterial crystal, and an output surface adjacently situated to at least one of the alternating layers of the metamaterial crystal; placing an object adjacent to the input surface of the FaSDOL; transmitting an image from the object adjacent to the input surface into the metamaterial crystal of the FaSDOL; and transmitting a magnified image out of the FaSDOL.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 4A illustrates an embodiment of a far-field sub-diffraction optical lens of the present invention;

FIG. 4B illustrates the orientation of the input and output surfaces of the far-field sub-diffraction optical lens of FIG. 4A, a conventional lens, and a viewer for conducting far-field sub-diffraction optical microscopy of the present invention;

FIG. 6 depicts a finite-element-method simulation results of a metamaterial crystal having a 2-D cylindrical geometry with two sources with sub-wavelength separation;

DETAILED DESCRIPTION OF ILLUSTRATIVE EMBODIMENTS

Figure 1:
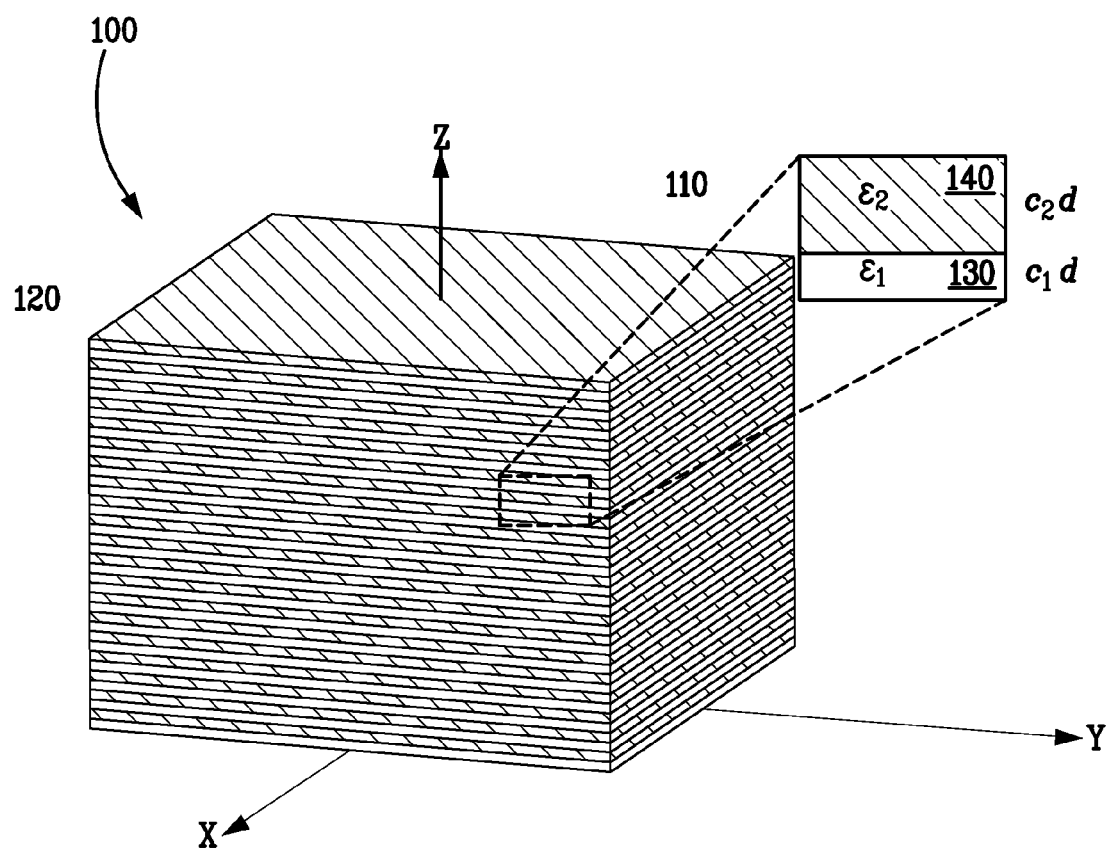
FIG. 1 illustrates the basic structure of a non-magnifying prior art one-dimensionally periodic layered metamaterial crystal comprising a plurality of alternating layers, denoted layer 1 and layer 2.

The present invention may be understood more readily by reference to the following detailed description taken in connection with the accompanying figures and examples, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

As employed above and throughout the disclosure, the following terms, unless otherwise indicated, shall be understood to have the following meanings.

"Layer" refers to a thin material that typically surmounts another material or object.

"Plurality" means two or more.

As used herein the reference numerals "1" and "2" are relative to one another and do not necessarily indicate order or preference.

The present invention incorporates the use of anisotropic crystals ("metamaterial crystals") which are suitable for near field optical processing. In several embodiments, metamaterial crystals are designed in such as way as to enable image magnification which can be readily detected using optical far-field microscopy techniques. Accordingly, many aspects of the present invention enable optical far-field microscopy having sub-diffraction resolution. In another embodiment, metamaterial crystals may be used in a cross-section independent waveguide. In cross-section independent waveguides, the light is confined to travel along the crystal axis so long as the walls of the waveguide do not intersect this path.

Far-field sub-diffraction optical lens of the present invention include metamaterial crystals that are designed to magnify sub-diffraction images of objects that are illuminated with photons characterized as having a wavelength $\lambda$: As used herein, the term "sub-diffraction" refers to the ability of the lenses of the present invention to resolve structures that are beyond the diffraction limitations of light waves using standard optical lenses. The diffraction limits of traditional optical lenses has historically been about half the wavelength of light used to illuminate the object, i.e., $\lambda/2$. Accordingly, sub-diffraction refers to the ability of the far-field sub-diffraction optical lenses of the present invention to resolve object features smaller than $\lambda/2$.

Suitable metamaterials include one-dimensionally periodic layered metamaterial crystals comprising a plurality of alternating layers. Two or more different types of alternating layers can be used, denoted layer "1" and layer "2". Each of the layers are characterized as comprising a layer thickness $d_1$, and $d_2$, and comprising an effective permittivity $\in_1$ and $\in_2$ at the wavelength $\lambda$, respectively. The metamaterial crystals are also characterized as having a unit cell of thickness d, wherein $c_1=d_1/d$ and $c_2=d_2/d$, wherein d is smaller than the wavelength $\lambda$. For the purposes of providing far-field sub-diffraction optical lenses, the parameters $\in_1$ and $\in_2$ are characterized according to the relationship $\in_2=-(c_1/c_2)\in_1$. Suitable values of $\in_1$ and $\in_2$ each have a real part in the range of from about $-20$ to $+20$.

At least one of the different types of material layers used in the metamaterial crystals is characterized as having a real effective permittivity less than zero and at least one has a real effective permittivity greater than zero at the wavelength $\lambda$. The layer characterized as having a real effective permittivity greater than zero at the wavelength $\lambda$ can comprise a dielectric material, a gain media, or any combination thereof. Suitable dielectric materials include diamond, silicon oxide, silicon dioxide, silicon nitride, silicon oxynitride, polymer, glass, a metal oxide, or any combination thereof. Suitable dielectric materials have positive real dielectric values, typically up to about 10, or even up to about 20. Such materials are readily applied as thin films using any of a variety of processes, such as vapor deposition, plasma deposition, sputtering, and the like.

Gain media may or may not be required. Gain media is useful in cases where optical gain (an increase in amplification) is desired. Suitable gain media comprises neodymium-doped yttrium aluminum garnet, ruby, aluminum gallium arsenide $Al_xGa(1-x)As$, III-V semiconductors and their compounds, gallium arsenide, gallium phosphide, indium gallium arsenide, gallium nitride, indium phosphide, gallium indium phosphide, or any combination thereof. Such materials are readily applied as thin films using any of a variety of processes, such as vapor deposition, plasma deposition, sputtering, and the like.

The layers characterized as having a real effective permittivity less than zero at the wavelength λ typically comprises a plasmonic material. Suitable plasmonic materials include one or more metals, such as copper, silver, gold, aluminum or any combination thereof, and/or Silicon Carbide in the mid infrared regime. Such materials are readily applied as thin films using any of a variety of processes, such as vapor deposition, plasma deposition, sputtering, and the like.

The unit cell thickness, d, is usually equal to the sum of the thicknesses of the layer 1 and layer 2, when only dielectric layers and plasmonic layers are alternately built up to provide the metamaterial crystals, i.e., $d=d_1+d_2$. Suitable values for $d_1$ and $d_2$ are each typically in the range of from about 4 nm to about λ/10, and more typically in the range of from about 6 nm to about 100 nm. Smallest values conceivable for the thicknesses of the layers could be about one atomic layer thick, or as small as about 0.2 nm, but is practically kept at least about 4 nm. Layers that are too thick are limited by their usability at a particular wavelength and magnification. If other layers are present, such as a gain layer of thickness $d_g$, then the unit cell will include the gain layer and the unit cell thickness, d, will be approximately the sum of the thicknesses of layer 1, layer 2, and any additional layers, such as a gain layer, e.g., $d=d_1+d_2+d_g$. The unit cell thickness, d, is suitably smaller than λ. Typically, d is smaller than about 120 nm, or even about 60 nm, or even about 30 nm. In embodiments composed of alternating layers 1 and 2, the values of $c_1$ and $c_2$ will be in the range of from about 0.05 to about 0.95, wherein $c_1+c_2=1$.

Suitable metamaterial crystals comprise up to about 10, or up to about 20, or up to about 50, or up to about 100, or up to about 300, or up to about 1000, or up to about 10,000, or up to about 100,000, or even up to about one million alternating layers. The alternating layers can be fashioned using a suitable serial process in which thin films are alternately deposited, one adjacent a previous one. Common thin film processes done serially are desirably kept to fewer than about 300 layers for reasons of economy. Less common thin film generation processes can also be used to prepare metamaterial crystals, examples being pH self oscillation, layer-by-layer chemical deposition, self-assembly, or any combination thereof.

The lenses of the present invention include an input surface adjacently situated to at least one of the alternating layers of the metamaterial crystal, the input surface capable of receiving an image from a specimen, light source, or both, the input surface capable of transmitting the image into the metamaterial crystal.

The lenses of the present invention also include an output surface adjacently situated to at least one of the alternating layers of the metamaterial crystal, the output surface capable of transmitting a magnified image out from the metamaterial crystal. The output surface and the input surface can be characterized as being spatially distinct, that is, they do not occupy the same region in space.

Some embodiments of the far-field sub-diffraction optical lens of the present invention comprise input surfaces that are planar. As used herein, the term planar refers to plan surfaces that extend outwards and do not necessarily fold in on themselves, or are not curved. An illustration of an embodiment of a far-field sub-diffraction optical lens having a planar input surface is provided in FIG. 4, as described further below. Accordingly, the output surface of a suitable metamaterial can, as a result, be a planar surface disposed at an angle $\theta_0$ relative to the input surface, wherein $\theta_0$ is not zero. Here, the output surface can be disposed at an angle $\theta_0$ relative to the input surface, wherein the magnified image at the output surface is about a factor $\cos(\theta_0)^{-1}$ larger than the image at the input surface. In these embodiments, the absolute value of the factor $\cos(\theta_0)^{-1}$ is greater than 1 to ensure magnification of the input image. Typically the absolute value of the factor $\cos(\theta_0)^{-1}$ is less than about λ/d. More suitably, the absolute value of the factor $\cos(\theta_0)^{-1}$ is less than about 5, or even less than about 2. In embodiments where the output surface and the input surfaces are planar, but not parallel, the output surface and the input surface may intersect along a line, or they may be connected by a plane. Any of a variety of geometries are possible.

Some embodiments of the present invention are characterized using input surfaces that are curved, metamaterial crystals that containing curved layers, or any combination thereof. Illustrations of a an embodiment of a far-field sub-diffraction optical lens having a curved layers is provided in FIGS. 6 and 7, as described further below. In contrast to the planar metamaterial crystals described as having an oblique cut which transverses the crystal planes, in the curved geometry, however, the crystal itself is bent or curved. Accordingly, the far-field sub-diffraction optical lenses may also comprise curved output surfaces. The curvature of the output surface can be represented as a dilation (increase in magnitude of area) and a translation of the shape of the input surface. Accordingly, the magnitude of the area of the output surface is greater than the magnitude of the area of the input surface. The magnitude of the area of the output surface can be at least about twice as large, or five times larger, or even ten times larger, or even 20 times larger, or even 50 times larger, or even 100 times larger, or even 200 times larger than the magnitude of the area of the input surface.

In embodiments where the input and output surfaces can be characterized as having a radius of curvature, the radius of curvature of the output surface can be greater in magnitude than the radius of curvature of the input surface. Suitably, the radius of curvature of the output surface is at least about twice as large, or five times larger, or even ten times larger, or even 20 times larger, or even 50 times larger, or even 100 times larger, or even 200 times larger than the magnitude of the radius of curvature of the input surface.

In curved metamaterials, the radius of curvature can be up to about 100 nm, or up to about 200 nm, or up to about 500 nm, or up to about 1 micron, or up to about 2 microns, or up to about 5 microns, or up to about 10 microns, or even up to about 20 microns. The radius of curvature of the input surface is typically at least about 4.

The input and output surfaces can also be characterized as having a plurality of radii of curvatures. An illustration of an embodiment of a far-field sub-diffraction optical lens having a plurality of radii of curvatures of input and output surfaces is provided in FIG. 9, as described further below. Typically the input and output surfaces are characterized as having at least 3, at least 9, or even up to 10, up to 20, up to 50, up to 100, up to 1,000, up to 10,000, up to 100,000 or even up to one million radii of curvatures. Any of a variety of thin film processes can be serially applied as described hereinabove for the purposes of building up alternating curved layers of the metamaterial crystal material. Each of the curved surfaces can take on a variety of shapes, but typically the shape of the input surface will correspond to the shape of the output surface to effect magnification. Typically the input and output surfaces are characterized as an array of spherical shells. In these embodiments, each of the input surfaces can be characterized as having a radius of curvature as small as d, the thickness of the unit cell of the metamaterial crystal. For use in imaging system, for example, light that propagates in free space can be measured, with one pixel represented by an area as small as about $\lambda^2/4$. The surface area of a half sphere is $2\pi r^2$. Accordingly, the number of pixels is $2\pi r^2/(\lambda^2/4)$. If $\lambda$ is about 300 nm, then about a 5×5 array of adjacent spherical shells would be suitable. In this regard, the radius of curvature of the input surface can be as small as $\lambda$. An upper limit of about 20 microns for the radius of curvature is essentially limited by optical loss in the metamaterial layers and the desired magnification. In most n×n arrays, where n is small (less than about 5), the center curved element of the array can function as a suitable far-field sub-diffraction optical lens of the present invention. The surrounding curved elements of the arrays are artifacts of the manufacturing process. A 9×9 array was used so that the growth of the layers does not close the opening to the center most sphere. Many lenses in parallel may further be provided for n×n arrays of spherical adjoining shells, for example, where n is greater than about 9, or greater than 36, or even greater than about 100, or 500, or even 1000.

Far-field sub-diffraction optical lens systems can also be fashioned from a plurality of the far-field sub-diffraction optical lenses described herein. For example, two or more FaSDOLs can be optically coupled, for example, the output surface of at least one of the far-field sub-diffraction optical lenses can be in optical communication with the input surface of at least one other far-field sub-diffraction optical lens.

Far-field sub-diffraction optical microscopes can also be constructed using the far-field sub-diffraction optical lens described herein. For example. the output plane of the far-field sub-diffraction optical lens can be in optical communication with one or more conventional optical lenses or detectors. In another example, the output plane of two or more far-field sub-diffraction optical lenses can be in optical communication with one or more conventional optical lenses or detectors.

In the design and operation of the FaSDOLs and FaSDOL-containing systems and microscopes of the present invention, consideration for the operating wavelength, $\lambda$, is usually needed. The operating wavelength need not just be in the visible portion of the spectrum. For example, $\lambda$ can be in the ultraviolet and deep ultraviolet wavelengths shorter than about 400 nm. On the other hand, near-infrared, infrared as well as far infrared wavelengths longer than about 800 nm can be chosen in certain applications too. Suitable values of the wavelength $\lambda$ can be in the range of from about 100 nm to about 2000 nm, or even in the range of from about 200 nm to about 1200 nm, or even in the range of from about 400 nm to about 800 nm.

The FaSDOLs and FaSDOL-containing systems and microscopes of the present invention can be used to optically resolve features of an object smaller than the wavelength of light used. Accordingly, methods of optically resolving features of an object smaller than the wavelength of light used to image the object, comprise the steps of providing a FaSDOL, placing an object adjacent to said input surface of the FaSDOL; transmitting an image from said object adjacent to the input surface into the metamaterial crystal of the FaSDOL; and transmitting a magnified image out of the FaSDOL. In these methods of magnifying an object smaller than the wavelength of light, at least a portion of the object adjacent to the input surface of the metamaterial crystal can be illuminated with a light source comprising a light wavelength $\lambda$.

EXAMPLES AND OTHER ILLUSTRATIVE EMBODIMENTS

Metamaterials. FIG. 1 illustrates the basic structure of a non-magnifying prior art one-dimensionally periodic layered metamaterial crystal 100 comprising a plurality of alternating layers, denoted layer 1 and layer 2. The structure of the crystal is shown in FIG. 1, and the inset describes the various parameters as follows: unit cell of the metamaterial crystal 110, is composed of a first layer (denoted "1") 130 of the unit cell 110, a second layer (denoted "2") of the unit cell 110. The periodic structure of the metamaterial crystal 120 is depicted as composed of alternating layers of material types "1" and "2".

The unit cell 100 of this periodic structure 120 is formed by two thin slices with thicknesses $d_1$ and $d_2$, made of materials with differing permittivities $\in_1$ and $\in_2$. The layer thickness is denoted $d=d_1+d_2$, and two coefficients $c_1$, and $c_2$ are defined as $d_1=c_1 d$ and $d_2=c_2 d$ so that dimensionless coefficients satisfy the relationship $c_1+c_2=1$. In addition to $\in_1$ and $\in_2$, the two coefficients $c_1$, and $c_2$ also offer degrees of freedom the design of far-field sub-diffraction optical lenses and other embodiments as described further herein. This periodic structure is characteristically anisotropic and, if the thickness of the unit cell d is small enough with respect of the operating wavelength, the metamaterial crystal can be considered as an anisotropic metamaterials with effective permittivity tensor given by:

$$\overline{\varepsilon} = \varepsilon_0 \begin{pmatrix} \varepsilon_T & 0 & 0 \\ 0 & \varepsilon_T & 0 \\ 0 & 0 & \varepsilon_z \end{pmatrix} \quad (1)$$

with $\in_T=(c_1\in_1+c_2\in_2)/(c_1+c_2)$ and $\in_z=(c_1+c_2)\in_1\in_2/(c_2\in_1+c_1\in_2)$.

|For different purposes, a similar structure has been considered in (S. Anantha Ramakrishna, J. B. Pendry, M. C. K. Wiltshire, W. J. Stewart, *Journal of Modern Optics*, 50, 9, p 1419 (2003)) where interesting electromagnetic properties have been outlined. More general situations such as the case including unequal layer thicknesses and the case including anisotropic permeability and effective permittivity has also been analyzed in (S. Feng and J. Elson, Opt. Express 14, 216-221 (2006)) and (D. Schurig and D. R. Smith, *New Journal of Physics* 7, 162 (2005)), respectively, where some interesting properties in the case of sign($\in_z$)≠sign($\in_T$) have been investigated in D. Schurig and D. R. Smith, *New Journal of Physics* 7, 162 (2005). With this condition, the effective permittivity tensor becomes similar to that of an anisotropic plasma and thus provides similar propagation characteristics to that of an anisotropic plasma. One of the most striking phenomena occurring in wave propagation in such media is the *cones of resonance*(R. K. Fisher and R. W. Gould, *Phys. Rev. Lett.* 22, 1093-1095 (1969); K. G. Balmain, A. A. E. Luttgen, P. C. Kremer, *Antennas and Wireless Propagation Letters*, 1, 1, 146 (2002)), studied extensively by Balmain and his co-workers (K. G. Balmain, A. A. E. Luttgen, P. C. Kremer, *Antennas and Wireless Propagation Letters*, 1, 1, 146 (2002)). This can be derived from the dispersion relation $(k_T^2/\in_z)+(k_z^2/\in_T)=k_0^2$ for a plane wave with wave vector $k=k_T+k_z\hat{z}$ in such media (S. Anantha Ramakrishna, J. B. Pendry, M. C. K. Wiltshire, W. J. Stewart, *Journal of Modern Optics*, 50, 9, p 1419 (2003)).|

Figure 2:
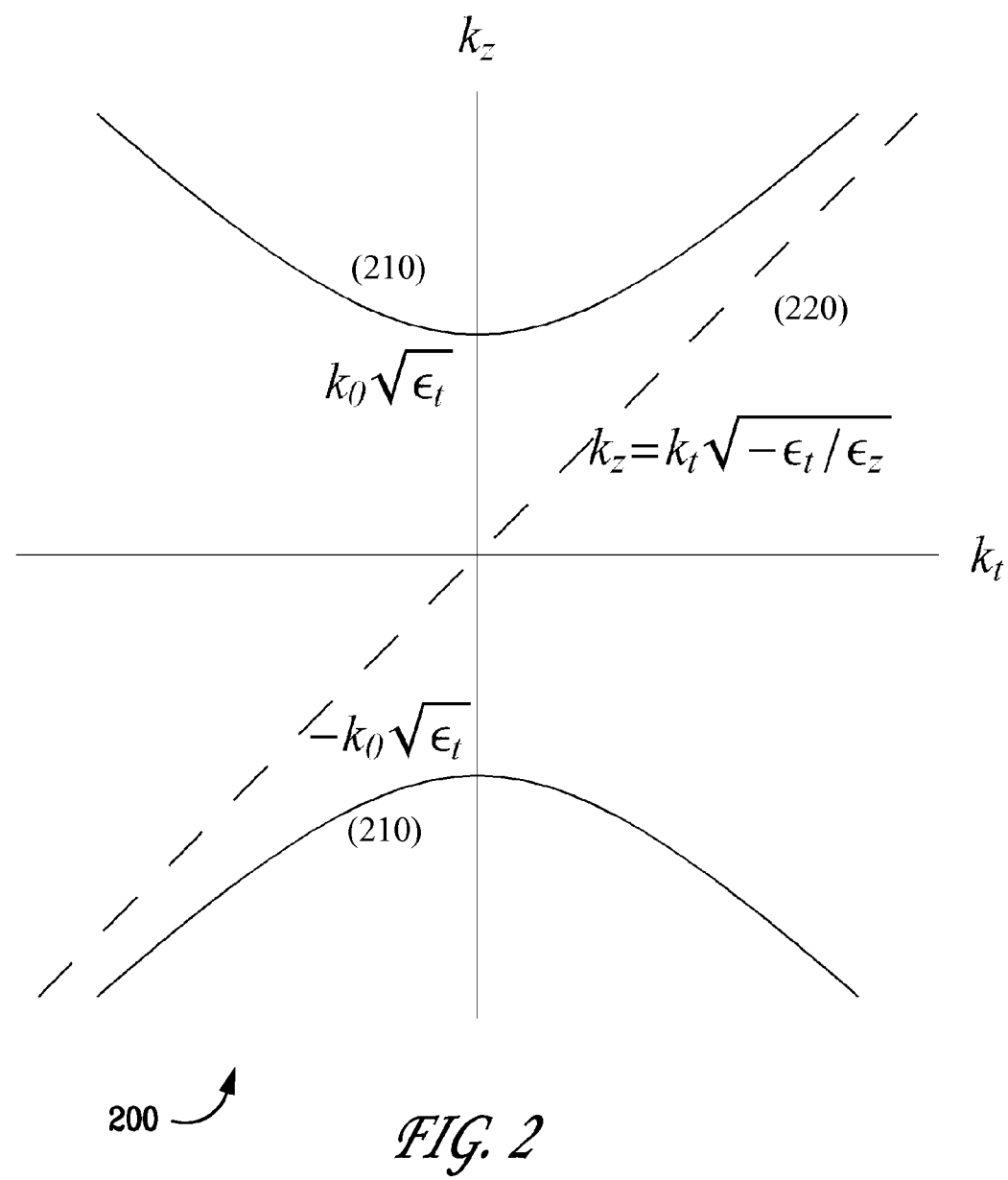
FIG. 2 illustrates an hyperbolic dispersion relationship for wave propagation in a metamaterial crystal.

In the k space, this equation represents either an ellipse or a hyperbola depending on the signs of the effective permittivity tensor elements. When $\text{sign}(\in_z) \neq \text{sign}(\in_T)$, the dispersion relation represents a hyperbola with the asymptotes given by $k_z = \pm \sqrt{|\in_T/\in_z|} k_T$. Owing to the hyperbolic shape of the equi-frequency curves, the high spatial frequency components of a field will propagate closer and closer to the direction given by the asymptotes of this hyperbola in a ray-like fashion. This is illustrated in FIG. 2, which depicts the hyperbolic dispersion relationship for wave propagation in a metamaterial crystal, wherein line 210 is the hyperbolic equi-frequency curve and dashed line 220 is the asymptote of the hyperbola. If the parameters $c_1$, $c_2$, $\in_1$, and $\in_2$ are chosen such that $\in_T \to 0$, the "cone of resonance" collapses into a single ray, almost undistorted. In other words the field distribution in an arbitrary plane is transferred, point by point, by those parallel rays to any other arbitrary plane, in general almost undistorted under the proper conditions on the effective permittivity tensor elements. This $\in_T \to 0$ feature is used as a design parameter in the far-field sub-diffraction optical lenses, systems, and imaging systems of the presently described invention.

Figure 3:
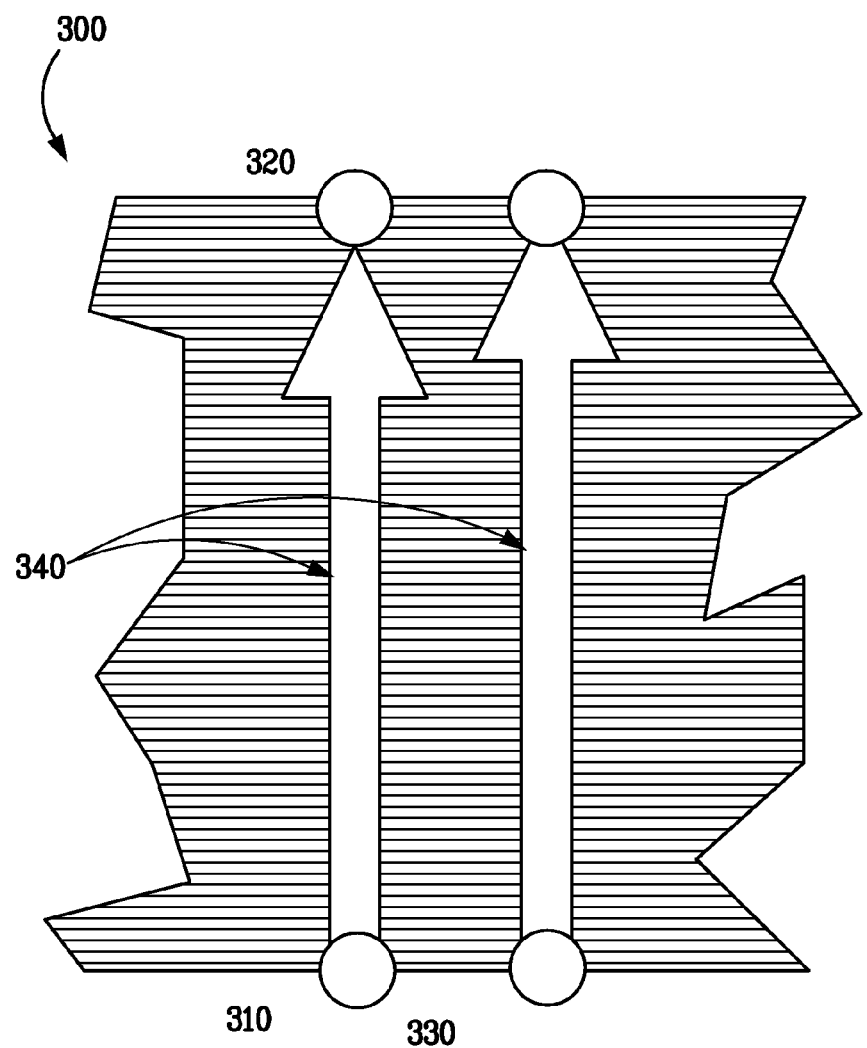
FIG. 3 illustrates a waveguide structure propagating through a metamaterial crystal.

FIG. 3 illustrates a waveguide structure propagating through a metamaterial crystal 300, comprising an input surface 310, an output surface 320, and input field distribution 330 and rays propagating within the structure 340. Consider the above-mentioned metamaterial crystal with a finite number of layers, where the outer face of the first bottom layer (310) is the input (i.e., object) surface of the system while the external face of the last layer (320) is the output surface. If there is a certain field distribution on the input surface, under the condition $\in_T \to 0$ and no, or minimal, material loss, a copy of the input distribution (330) will be transferred to the output surface through the set of rays (340) parallel to the axis of stratification. This can be used as a unique waveguide that does not provide any image magnification. So long as the optical paths of the rays do not intersect with the boundary of the structure, only the crystalline direction, not the crystalline shape, determines the direction of propagation. Additionally, since the radiation from a point source is spatially confined within a ray, two distinct points of light generate two non-intersecting rays and so data of a single frequency may be transferred in parallel from the input surface to the output surface, again, without magnification. These two distinct points, may be separated by a distance which is subwavelength (FIG. 3).

As stated previously, this structure is made of alternating layers of positive effective permittivity and negative effective permittivity materials. In the microwave regime, artificial materials with negative permittivities have been realized through metallic inclusions in a dielectric matrix. In the optical regime, many metals exhibit negative permittivity naturally. Such metals include copper, silver, and gold. Very thin layers (<50 nm) of these metals are routinely applied though microfabrication processes including evaporation, sputtering, and molecular beam epitaxy. Additionally, very thin dielectric layers are also routinely fabricated in microfabrication facilities using similar processes.

An image of an object having a resolution smaller than the wavelength of the light illuminating the object is provided by magnifying the input image within the far-field sub-diffraction optical lens according to the present invention. Two distinct points of light separated by less than a wavelength are transferred from the input surface to the output surface, and a method of recovering this image for additional processing using standard optical lenses or a suitable photodetector is provided. For example, the present invention provides for magnification of the image in the metamaterial before the image exits the output surface and propagates into free-space. Referring to FIGS. 4A and 4B, for example, there is provided a far-field sub-diffraction optical lens 400 comprising a metamaterial crystal having a plurality of alternating layers with an input surface (i.e., input plane) 402 and an output surface (i.e., output plane) 404 suitable for magnifying an image, here represented as two distinct point features of an object, 410 and 420 separated by distance d'. FIG. 4A illustrates an embodiment of a far-field sub-diffraction optical lens of the present invention. FIG. 4B illustrates an orientation of a system for conducting far-field sub-diffraction optical microscopy of the present invention. This system includes an input surface 402 and an output surface 404 of the far-field sub-diffraction optical lens 400 of FIG. 4A. A conventional lens 406, which can be replaced by, or include in addition to the lens, a suitable photodetecting device, such as a charge-coupled device ("CCD") (not shown) as is known in the art, is also optically coupled to the output plane for collecting digital images of sub-wavelength structures on objects. FIGS. 4A and 4B illustrate this magnifying setup, which can be realized by obliquely cutting a metamaterial crystal. In these illustrations 410 represents a first point source from an object (not shown) at input surface 402; 420 represents a second point source at the input surface; 430 represents an image of the first point source at the output surface; 440 represents an image of the second point source at the output surface. In this embodiment, the output surface 404 is made with an oblique angle $\theta_0$ not parallel to the input surface 402. Accordingly, magnification arises from the area of the image or distance between the point features of the object or image at the output surface (d) that is larger than the area of the image or distance between point sources of the image at the input surface (d').

For the embodiment described in FIGS. 4A and 4B case, if the distance between two sources (410, 420; corresponding to 510, 520 in FIGS. 5A and 5B, see below) on the input surface is d', under the conditions $\in_T \to 0$ and an essentially lossless crystal, images (430, 440) will be transferred to the oblique output surface by means of two parallel rays, and the image separation will appear to be $d = d'/\cos(\theta_0)$ on that surface. Since $\cos(\theta_0) < 1$, the "secondary sources" generated on the output surface can be far enough apart to be resolved by a conventional far-field optical microscope focused on the output surface. This feature is described in more analytical detail below. Design criteria for the system are also described in further detail below, such as useful materials for creating metamaterial crystals.

Properly-designed and obliquely-cut metamaterial crystals, as described herein, can modify the angular spectrum of an input field distribution. Such metamaterial crystals enable conventional far-field microscopes and digital image collection devices to image the input spatial details with resolution higher than $\lambda_0/2\sqrt{\in_r}$. For this, consider that an x'-polarized transverse electromagnetic (TEM) wave is incident normally on the input surface of the crystal. The presence of an object adjacent to the input surface of the crystal will result in a certain field distribution that can be imaged by this system. Using the notation in FIGS. 4A and 4B, a magnetic field distribution $h_y(x')$ can be denoted at the input surface whose angular spectrum in given by $\tilde{h}_y(k_x')$. Similarly the field distribution and the angular spectrum can be denoted at the output surface as $H_y(x)$ and $\tilde{H}_y(k_x)$, respectively. The field distribution at the output surface can be written in terms of the angular spectrum on the input surface using the following expression:

$$H_y(x, 0) = \int_{-\infty}^{\infty} T(k_x')\tilde{h}_y(k_x')e^{ik_x'x\cos(\theta_0)}e^{i\sqrt{k_0^2\epsilon_T - k_x'^2\frac{\epsilon_T}{\epsilon_z}}\,x\sin(\theta_0)} dk_x' \quad (2)$$

where $T(k_x')$ represents the transmission coefficient at the output surface.

Under the condition $\in_T=0$, the transmission coefficient is unity and the second exponential term in Eq. (2) also becomes unity. The angular spectrum at the output surface can then be described as:

$$\tilde{H}_y(k_x) = \int_{-\infty}^{\infty} \tilde{h}_y(k_x')\delta[k_x - k_x'\cos(\theta_0)]\,dk_x' \quad (3)$$

$$= \frac{1}{\cos(\theta_0)}\tilde{h}_y\left[\frac{k_x}{\cos(\theta_0)}\right]$$

These equations demonstrate that a suitable metamaterial crystal, under the condition $\in_T=0$ and lossless materials, is able to transfer the field from the input surface to the oblique output surface, in principle without any distortion, compressing the angular spectrum by a factor of $\cos(\theta_0)$ or, in other words, magnifying the image by a factor of $\cos(\theta_0)^{-1}$ along the x axis. Magnification along the y axis can be achieved by having the output surface of one crystal as the input surface of a second crystal with a different output cut. Various combinations of two or more crystals with various magnify factors can be suitably combined to provide systems comprising a plurality of far-field sub-diffraction optical lenses.

The condition $\in_T=0$ may be achieved using perfectly lossless materials with permittivities related by:

$$\in_2 = -(c_1/c_2)\in_1 \quad (4)$$

In other words, one of the materials has an effective permittivity with a negative real part, which can be found, for instance, in many noble metals (e.g., Ag and Au) as plasmonic media below their plasma frequency (E. D. Palik, *Handbook of Optical Constants of Solids* (Academic Press, San Diego Calif., 1991)). However, due to typical material losses, the ideal condition $\in_T=0$ can only be approximately met. This in turn leads to broadening and attenuation of the rays propagating from the input to the output surfaces in the crystal. While satisfying the condition (4), this effect can in part be reduced by decreasing the thickness of the layers made of the material with higher losses. The rays that travel a longer distance are more attenuated, but this effect can be compensated through a non uniform illumination of the input surface.

Figure 5A:
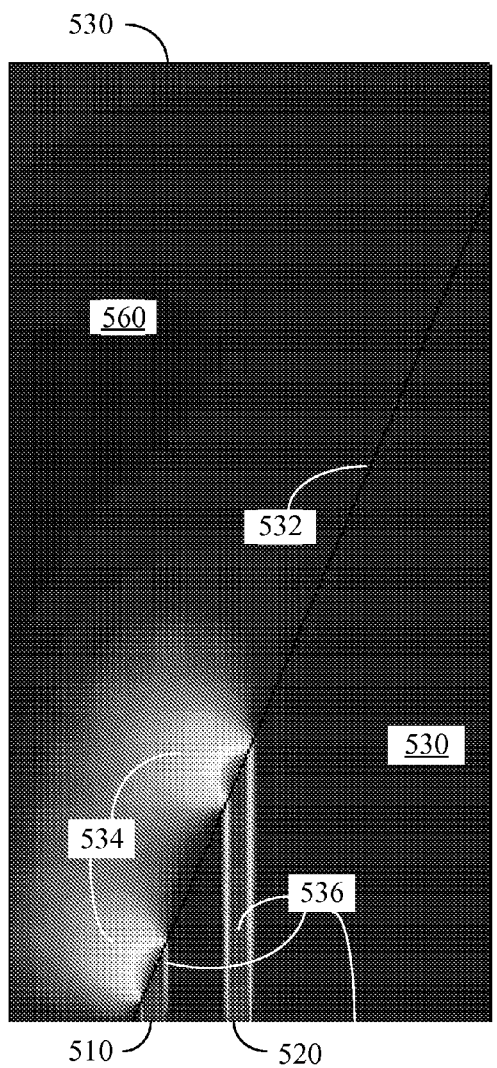
FIG. 5 depicts finite-element-method simulation results of a 2-D lossless (A) and a lossy (B) metamaterial crystal with an oblique cut as shown by the solid black diagonal line.
Figure 5B:
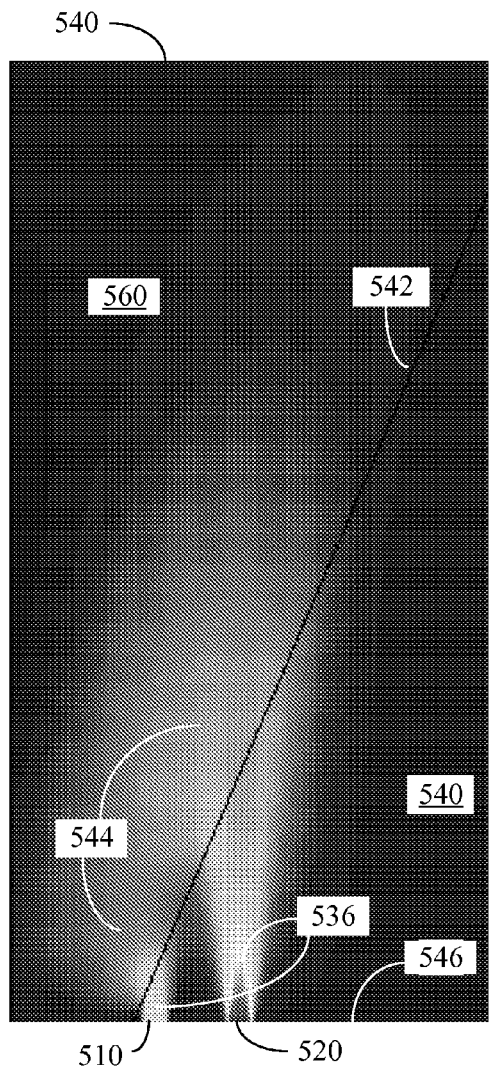

The far-field sub-diffraction optical lens illustrated in FIGS. 4A and 4B was analyzed using finite-element-method simulations. Referring to FIGS. 5A and 5B, respectively, there are presented finite-element-method (FEM) simulations (using the software package FEMLAB™), comparing the ideal lossless structure (530) (as an effective medium) with a lossy structure (540) (as an effective medium). The lossy structure of the metamaterial simulated in FIG. 5B incorporates a plasmonic material that is silver illuminated at 633 nm ($\in=-18+i0.5$) and a glass dielectric ($\in=2.2$). In these simulations, an anisotropic crystal with effective permittivity tensor is given in Eq. (1) with $\in_1=-18+i0.5$, $\in_2=2.2$, $c_1=0.11$, and $c_2=0.89$. In the lossy embodiment of FIG. 5B, the two sources are illuminated unequally, with an amplitude ratio of 1:2.1, in order to compensate for the attenuation of the longer ray suffers. The finite-element-method simulations of a 2-D lossless (FIG. 5A) and a lossy (FIG. 5B) crystal (530 and 540, respectively) with an oblique cut (532 and 542, respectively) are shown. The two light sources 510, 520 at the input surface (536 and 546, respectively), and their images (534 and 544, respectively) at the output surface (532 and 542, respectively) are simulated. The effects of the material loss in broadening and in attenuation of the rays 536 are evident in FIG. 5B.

FIG. 6 depicts finite-element-method simulation results of a metamaterial crystal 600 having a 2-D cylindrical geometry of alternating plasmonic layers 610 and dielectric layers 620 with two sources 606 having sub-wavelength separation. The non-uniform attenuation of the rays in the obliquely cut embodiments depicted in FIGS. 4A and 4B can be minimized by using a curved geometry such as a spherical geometry, or a 2-D cylindrical geometry, which is shown in FIG. 6. A suitable 2-D cylindrical geometry is composed of alternating thin layers 610, 620 of materials with $\in_1$ and $\in_2$. The curved geometries magnify an image provided at the input surface 604, which exits the metamaterial at output surface 602. The curved metamaterial crystal depicted in FIG. 6 propagates light in a similar fashion as that of the planar oblique version depicted in FIGS. 4A and 4B. In addition, the curved geometries also preserve the angular distribution of the fields rather than just the field distribution itself. As in the planar case, optical performance is maximized by minimizing optical loss in the material layers.

Figure 7:
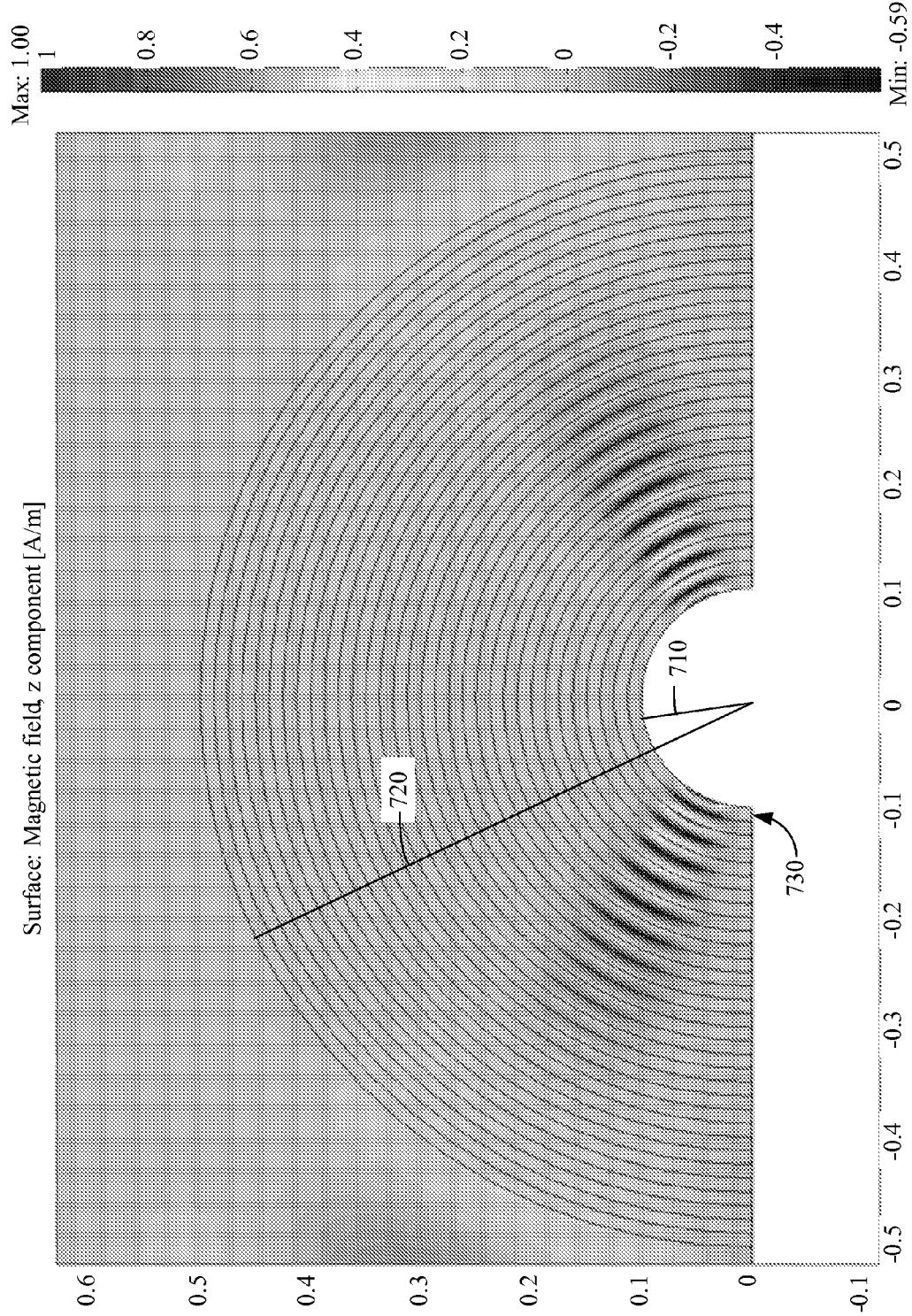
FIG. 7 depicts finite-element-method simulation results of 2-D cylindrical geometry with alternating layers of silver and diamond.

Referring to FIG. 7, there is provided a finite-element-method simulation of a far-field sub-diffraction optical lens of the present invention comprising 2-D cylindrical geometry with alternating layers of plasmonic metal and dielectric materials. In this figure, 710 is the radius of the inner curved surface of the metamaterial crystal; 720 is the radius of the outer curved surface; and 730 refers to the layer thickness. In this embodiment, silver and diamond are incorporated as the alternating shell layers. The operating wavelength used in this embodiment is within the range of blue light ($\lambda=412$ nm). At that frequency the permittivity of silver is $\in_s=-5.08+i0.226$ and the permittivity of diamond is $\in_d=5.08$. The inner radius 710 is $\lambda/4\approx100$ nm and the outer radius 720 is $5\lambda/4 \approx 500$ nm and the layer thickness 730 is $\lambda/32\approx15$ nm.

Figure 8:
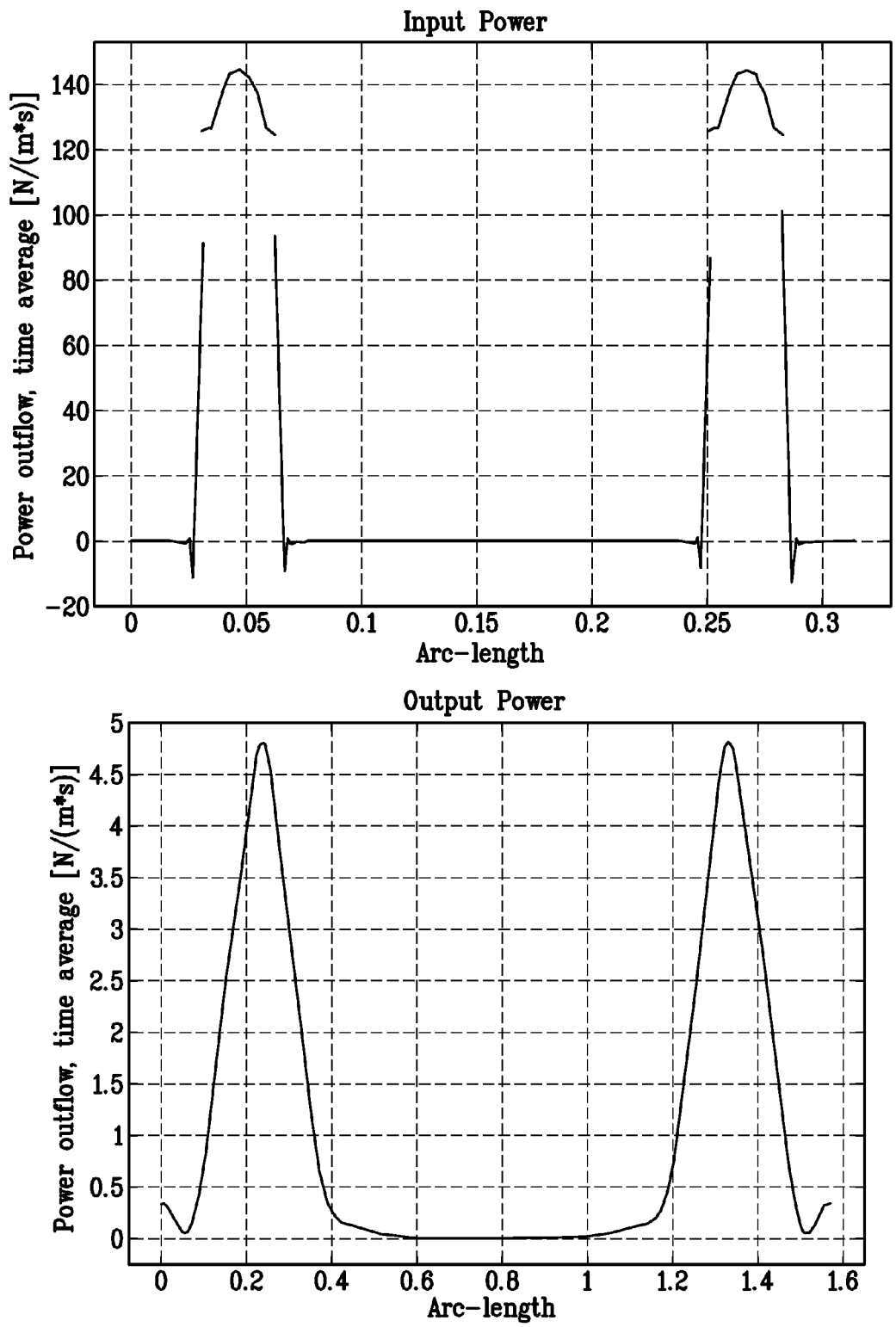
FIGS. 8A and 8B depicts finite-element-method simulation results of the input and output power flow distribution of the 2-D cylindrical geometry with alternating layers of silver and diamond depicted in FIG. 7.

The performance of the embodiment in FIG. 7 was simulated with a finite element method commercial code (FEMLAB™). FIGS. 8A and 8B provide the results of a finite-element-method simulation of the input and output power flow distribution, respectively, of the 2-D cylindrical geometry with alternating layers of silver and diamond provided in FIG. 7. Comparing the input surface field (FIG. 8A) to the output surface field (FIG. 8B), this cylindrical configuration provides a 5× near field magnification and an output power of about $P_{out}=P_{in}/30$. Even without any attempt to compensate for losses in the silver and diamond materials, this cylindrical far-field sub-diffraction optical lens is capable of providing a useful 5× near field magnification. This 5× magnification allows to image in far-field details in the order of $\lambda/10$ as opposed to the $\lambda/2$ conventional limit.

A variety of nanoscale and microscale materials processing techniques, such as sputtering and vapor deposition techniques, can be utilized to prepare the far-field sub-diffraction optical lenses of the present invention. Structures present additional complications in fabrication as the layers are uniformly applied to a curved surface. While deposition techniques that use point sources such as evaporation and molecular beam epitaxy could possibly be used, sputter coating techniques for depositing well-controlled layers of materials can be readily used. For example, silver and diamond can be readily sputter coated in thin layers. Sputtering techniques are particularly preferred for applying thin layers of materials of controlled thickness on the tens of nanometers scale to curved surfaces. An example of a fabrication process giving rise to a suitable far-field sub-diffraction optical lens having a plurality of curved input and output surfaces is described next.

Figure 9:
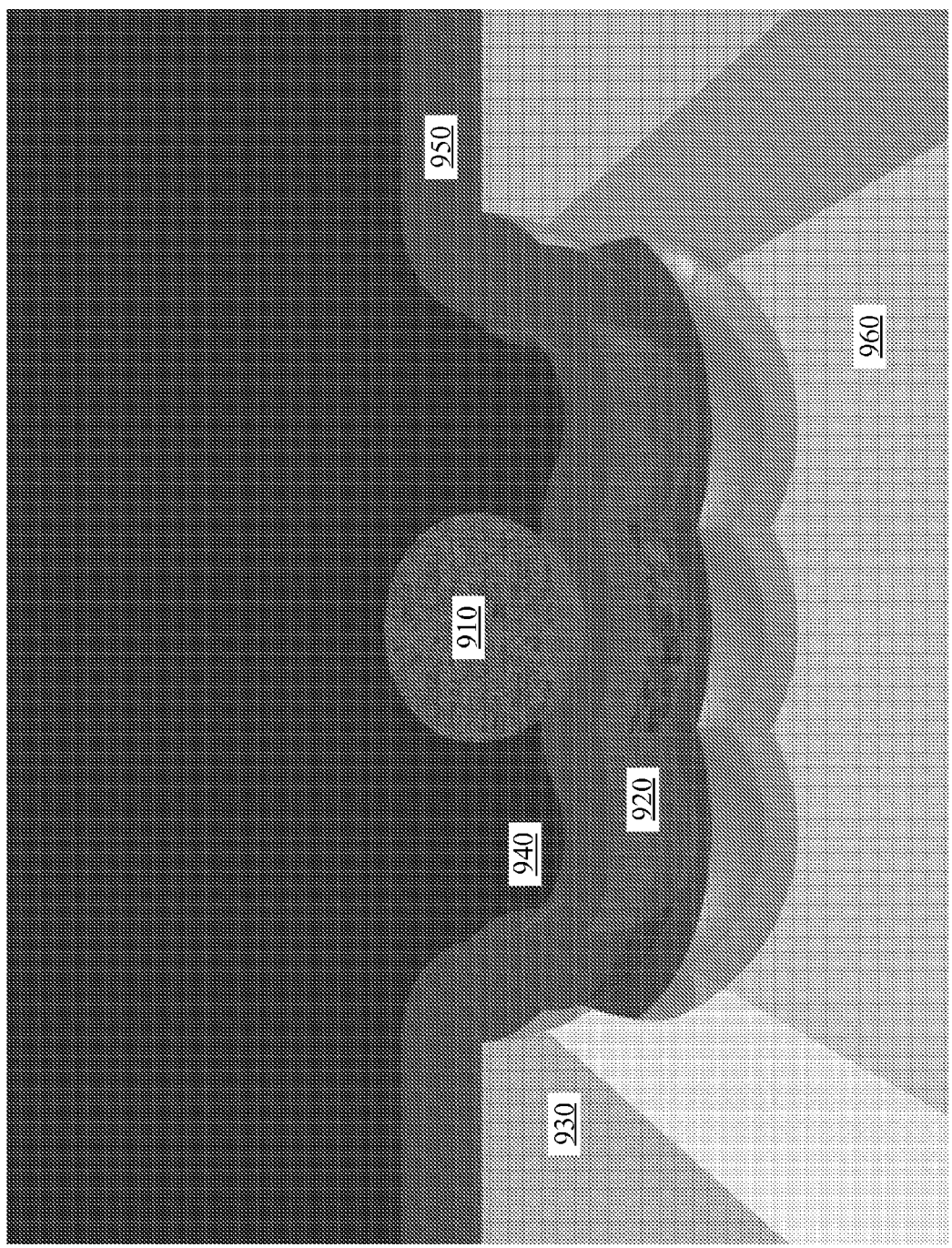
FIG. 9 depicts an embodiment of a FaSDOL of the present invention for use in an inverted microscope in the application of imaging a cellular surface; the input and output surfaces of the FaSDOL are depicted as a 3×3 array of adjacent spherical shells.

Referring to FIG. 9, there is provided an example of curved FaSDOL lens suitable for use in an inverted optical microscope. The input and output surfaces of this FaSDOL are depicted as a 3×3 array of adjacent spherical shells. The structures shown in FIG. 9 are as follows: 910 is an object to be observed; 920 is an image of the object; 930 is a suitable substrate upon which the FaSDOL is fabricated, such as a silicon wafer; 940 is an array of 3×3 spherical cavities; 950 is a layered medium making up the FaSDOL; and 960 is the optical path to suitable far field optics, digital imaging capture, or both. In this figure, the curved FaSDOL lens is depicted in the application of imaging a cellular surface. Here the FaSDOL lens can represent the first optical element in an otherwise normal inverted microscope operating in transmission mode. The FaSDOL lens 940 is depicted with an object 910 positioned adjacent to an inner curved surface of the FaSDOL lens. The image 920 of the surface of the object 910 adjacent to the input surface is magnified on the output surface. The object 910, such as a cell, can be illuminated from above resulting in the appearance of the image of the surface of the cell on the underside of the layered structure (at 920). Because of the curved shape of the layered structure, the features on the image of the cell on the underside are larger than the actual features on the cell surface, resulting in magnification. Rather than imaging the cell itself, the conventional objective lens focuses on the underside of the FaSDOL lens.

The FaSDOL lens depicted in FIG. 9 can be fabricated using standard microfabrication techniques. One possible fabrication process is as follows.

1. Beginning with a standard (100) n-silicon wafer (930).
2. The wafer is first oxidized to form a silicon nitride on both surfaces.
3. A 3×3 array of holes with diameters of 100 (nm) with a spacing of 800 (nm) are patterned into the upper nitride surface through electron-beam lithography.
4. The wafer is exposed to an isotropic etch which allowed to etch until a depth of 15 (μm) (940).
5. The upper nitride layer is etched away, leaving nine intersecting spheres etched in the silicon wafer.
6. The layered structure FaSDOL is then deposited using the spheres as a template to a thickness of approximately 400 (nm). This is performed by the alternate sputtering of a dielectric and a plasmonic material (950). The middle intersecting curve of the 3×3 array is readily usable as a lens as the other eight have side walls which may inhibit access to the input surfaces.
7. A window is then etched into the lower nitride surface and the wafer is exposed to anisotripic etch (such as KOH) to open up an optical pathway 960 to the output surface of the FaSDOL.

In this and related processes for preparing FaSDOLs having curved input and output surfaces, the outer radius can be about 500 nm and the inner radius can be about 100 nm, giving rise to a magnification of 5×. Using blue light with a wavelength of 412 nm and assuming that the inverted microscope can resolve at the theoretical limit of $\lambda/2$, this particular FaSDOL lens provide the ability to resolve down to about 40 nm.

Figure 10:
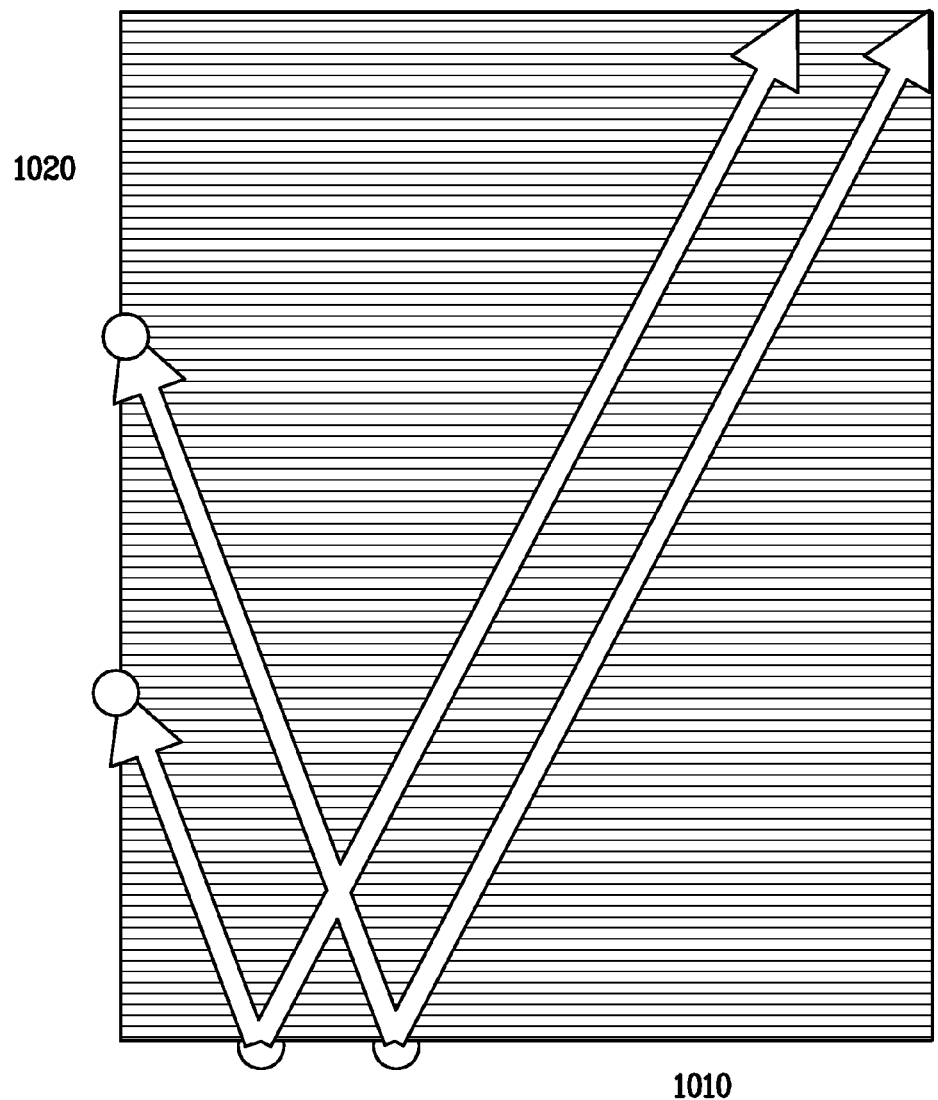
FIG. 10 illustrates a magnifying setup of an embodiment of the present invention in which a metamaterial crystal has a vertical output surface.

In the case of FaSDOLs comprising planar input and output surfaces, such as those described above, if the condition $\in_T \to 0$ is not met, the light emitted by a point at the input surface propagates along the surface of a cone at an angle equal to $\theta = \arctan(\sqrt{-\in_z/\in_T})$ with respect to the axis of stratification as shown in FIG. 10, which illustrates a magnifying setup using a vertically oriented output surface (i.e., the output planar surface 1020 forms a 90 degree angle relative to the input planar surface 1010). In order to have magnification in this case the output surface generally forms an angle $-\theta < \chi < \theta$ with respect to the axis of stratification. In this case two line sources at the input surface (1010) are mapped into two lines which are further apart at the output surface (1020). In the case of point sources the image at the output surface still carries sub-diffraction information, but needs post-processing (1110) in order to recover the field distribution at the input surface (1140). Dynamical phenomenon at the sub-wavelength scales may still be recorded in real time.

Figure 11:
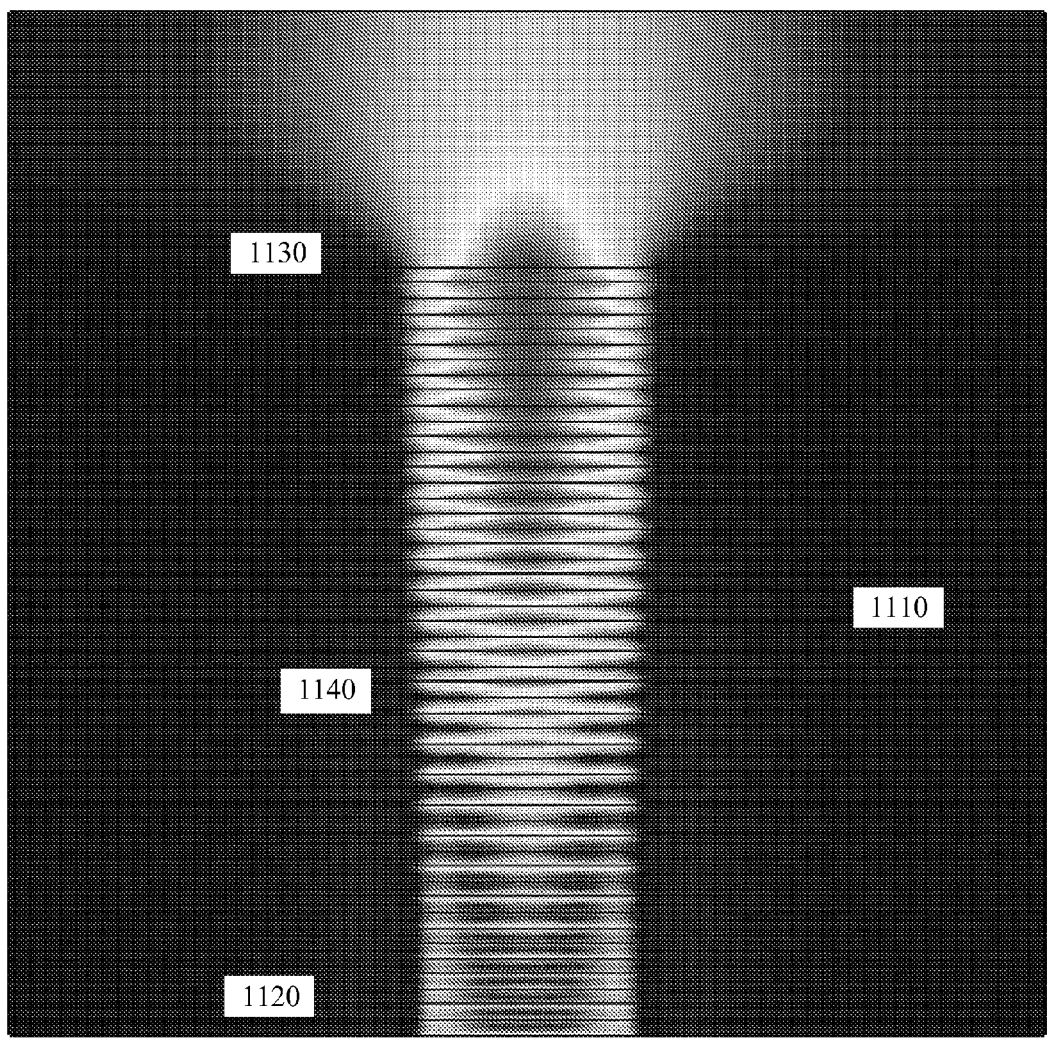
FIG. 11 depicts a finite element simulation of alternating plasmonic and gain media layers exhibiting diffractionless propagation while amplifying a light signal.

Referring to FIG. 11, there is depicted a finite element simulation of alternating plasmonic and gain media layers (1120) exhibiting diffractionless propagation while amplifying a light signal. In this figure, the labeled structures are as follows: 1110 is the FaSDOL structure; 1120 is the input surface; 1130 is the output surface; and 1140 represents a propagating amplified signal. Light intensity increases relatively with color, from blue (lower intensity) to yellow (medium intensity) to red (higher intensity). Materials that exhibit negative permittivities tend also to be lossy, which limits the distance a wave can propagate through the FaSDOL before the attenuation becomes so great that it is unusable. However, the losses can be compensated through continual amplification through use of a gain medium. Gain media are known to those in the art and have been successfully used in semiconductor optical amplifiers. A finite element analysis simulation is depicted in FIG. 11 where the dielectric layers exhibit slightly more gain than the losses presented by the plasmonic layers. Here it can be seen that the signal 1140 actually becomes stronger as it traverses the FaSDOL 1110 from the input surface 1120 to the output surface 1130.

What is claimed:

1. A far-field sub-diffraction optical lens, comprising:
a one-dimensionally periodic layered metamaterial crystal comprising a plurality of alternating layers comprising layer 1 and layer 2, each of said layers characterized as comprising a layer thickness $d_1$ and $d_2$, and comprising an effective permittivity $\in_1$ and $\in_2$ at a wavelength $\lambda$, respectively, wherein said metamaterial crystal is characterized as having a unit cell of thickness d, wherein $c_1 = d_1/d$ and $c_2 = d_2/d$, wherein d is smaller than the wavelength $\lambda$ and $c_1$ and $c_2$ are coefficients, wherein $\in_1$ and $\in_2$ are characterized according to the relationship $$\in_2 \approx -(c_1/c_2) \in_1;$$

an input surface adjacently situated to at least one of said alternating layers of said metamaterial crystal, said input surface capable of receiving an image from a specimen, light source, or both, said input surface capable of transmitting said image into said metamaterial crystal; and
an output surface adjacently situated to at least one of said alternating layers of said metamaterial crystal, said output surface capable of transmitting a magnified image out from said metamaterial crystal.

2. The far-field sub-diffraction optical lens of claim 1, wherein the input surface is planar.

3. The far-field sub-diffraction optical lens of claim 2, wherein the output surface is a planar surface disposed at an angle $\theta_0$ relative to the input surface, wherein $\theta_0$ is not zero.

4. The far-field sub-diffraction optical lens of claim 3, wherein the output surface is disposed at an angle $\theta_0$ relative to the input surface, wherein the magnified image at the output surface is about a factor $\cos(\theta_0)^{-1}$ larger than the image at the input surface.

5. The far-field sub-diffraction optical lens of claim 3, wherein the absolute value of the factor $\cos(\theta_0)^{-1}$ is greater than 1.

6. The far-field sub-diffraction optical lens of claim 5, wherein the absolute value of the factor $\cos(\theta_0)^{-1}$ is less than about $\lambda/d$.

7. The far-field sub-diffraction optical lens of claim 5, wherein the absolute value of the factor $\cos(\theta_0)^{-1}$ is less than about 5.

8. The far-field sub-diffraction optical lens of claim 5, wherein the absolute value of the factor $\cos(\theta_0)^{-1}$ is less than about 2.

9. The far-field sub-diffraction optical lens of claim 2, wherein the output surface and the input surface intersect along a line.

10. The far-field sub-diffraction optical lens of claim 1, wherein the input surface is curved.

11. The far-field sub-diffraction optical lens of claim 10, wherein the output surface is curved.

12. The far-field sub-diffraction optical lens of claim 10, wherein the magnitude of the area of the output surface is greater than the magnitude of the area of the input surface.

13. The far-field sub-diffraction optical lens of claim 10, wherein the magnitude of the area of the output surface is at least about twice as large as the magnitude of the area of the input surface.

14. The far-field sub-diffraction optical lens of claim 10, wherein the magnitude of the area of the output surface is at least about five times as large as the magnitude of the area of the input surface.

15. The far-field sub-diffraction optical lens of claim 10, wherein the radius of curvature of the output surface is greater than the radius of curvature of the input surface.

16. The far-field sub-diffraction optical lens of claim 10, wherein the radius of curvature of the output surface is at least about twice as large as than the radius of curvature of the input surface.

17. The far-field sub-diffraction optical lens of claim 10, wherein the radius of curvature of the output surface is at least about five times as large as than the radius of curvature of the input surface.

18. The far-field sub-diffraction optical lens of claim 10, wherein the radius of curvature of the output surface is up to about 200 times as large as than the radius of curvature of the input surface.

19. The far-field sub-diffraction optical lens of claim 10, wherein the input and output surfaces are characterized as having a plurality of radii of curvatures.

20. The far-field sub-diffraction optical lens of claim 19, wherein the input and output surfaces are characterized as having at least 3 radii of curvatures.

21. The far-field sub-diffraction optical lens of claim 19, wherein the input and output surfaces are characterized as having at least 9 radii of curvatures.

22. The far-field sub-diffraction optical lens of claim 19, wherein the input and output surfaces are characterized as having from about 100 to about a million radii of curvatures.

23. The far-field sub-diffraction optical lens of claim 19, wherein each of the input surfaces has a radius of curvature greater than about d.

24. The far-field sub-diffraction optical lens of claim 19, wherein each of the input surfaces has a radius of curvature greater than about 8 nm.

25. The far-field sub-diffraction optical lens of claim 19, wherein each of the output surfaces has a radius of curvature up to about 20 microns.

26. The far-field sub-diffraction optical lens of claim 10, wherein the input and output surfaces are characterized as an array of spherical shells.

27. The far-field sub-diffraction optical lens of claim 1, wherein the layer characterized as having a real effective permittivity greater than zero comprises a dielectric material, a gain media, or any combination thereof.

28. The far-field sub-diffraction optical lens of claim 27, wherein the dielectric material comprises diamond, silicon oxide, silicon dioxide, silicon nitride, silicon oxynitride, polymer, glass, a metal oxide, or any combination thereof.

29. The far-field sub-diffraction optical lens of claim 27, wherein the gain media comprises neodymium-doped yttrium aluminum garnet, ruby, aluminum gallium arsenide $Al_xGa(1-x)As$, III-V semiconductors and their compounds, gallium arsenide, gallium phosphide, indium gallium arsenide, gallium nitride, indium phosphide, gallium indium phosphide, or any combination thereof.

30. The far-field sub-diffraction optical lens of claim 1, wherein one of the layers being characterized as having a real effective permittivity less than zero comprises a plasmonic material.

31. The far-field sub-diffraction optical lens of claim 30, wherein the plasmonic material comprises a metal.

32. The far-field sub-diffraction optical lens of claim 30, wherein the metal comprises copper, silver, gold, aluminum, or any combination thereof.

33. The far-field sub-diffraction optical lens of claim 1, wherein d is smaller than about 120 nm.

34. The far-field sub-diffraction optical lens of claim 1, wherein d is smaller than about 60 nm.

35. The far-field sub-diffraction optical lens of claim 1, wherein d is smaller than about 30 nm.

36. The far-field sub-diffraction optical lens of claim 1, wherein $c_1$ and $c_2$ are in the range of from about 0.05 to about 0.95.

37. The far-field sub-diffraction optical lens of claim 1, wherein the metamaterial crystal comprises up to about 10 alternating layers.

38. The far-field sub-diffraction optical lens of claim 1, wherein the metamaterial crystal comprises up to about 20 alternating layers.

39. The far-field sub-diffraction optical lens of claim 1, wherein the metamaterial crystal comprises up to about 50 alternating layers.

40. The far-field sub-diffraction optical lens of claim 1, wherein the metamaterial crystal comprises up to about 300 alternating layers.

41. The far-field sub-diffraction optical lens of claim 1, wherein the metamaterial crystal comprises up to about 1,000 alternating layers.

42. The far-field sub-diffraction optical lens of claim 1, wherein the metamaterial crystal comprises up to about 10,000 alternating layers.

43. The far-field sub-diffraction optical lens of claim 1, wherein the metamaterial crystal comprises up to about 100,000 alternating layers.

44. The far-field sub-diffraction optical lens of claim 1, wherein the metamaterial crystal comprises up to about a million alternating layers.

45. The far-field sub-diffraction optical lens of claim 1, wherein $d_1$ and $d_2$ are each in the range of from about 4 nm to about $\lambda/10$.

46. The far-field sub-diffraction optical lens of claim 45, wherein $d_1$ and $d_2$ are each in the range of from about 6 nm to about 100 nm.

47. The far-field sub-diffraction optical lens of claim 1, wherein $\in_1$ and $\in_2$ each have a real part in the range of from about −20 to +20.

48. A far-field sub-diffraction optical lens system comprising a plurality of the far-field sub-diffraction optical lenses of claim 1.

49. The far-field sub-diffraction optical lens system of claim 48, wherein the output plane of at least one of the far-field sub-diffraction optical lenses is in optical communication with the input plane of at least one other far-field sub-diffraction optical lens.

50. A far-field sub-diffraction optical microscope comprising the far-field sub-diffraction optical lens system of claim 48, wherein the output plane of the far-field sub-diffraction optical lenses are in optical communication with one or more conventional optical lenses or detectors.

51. A far-field sub-diffraction optical microscope comprising the far-field sub-diffraction optical lens of claim 1, wherein the output plane of the far-field sub-diffraction optical lens is in optical communication with one or more conventional optical lenses or detectors.

52. The far-field sub-diffraction optical lens of claim 1, wherein the wavelength $\lambda$ is in the range of from about 100 nm to about 2000 mm.

53. The far-field sub-diffraction optical lens of claim 52, wherein the wavelength $\lambda$ is in the range of from about 200 nm to about 1200 nm.

54. The far-field sub-diffraction optical lens of claim 52, wherein the wavelength $\lambda$ is in the range of from about 400 nm to about 800 nm.

55. A method of optically resolving features of an object smaller than the wavelength of light used to image the object, comprising:

providing a FaSDOL comprising a one-dimensionally periodic layered metamaterial crystal having a plurality of alternating layers comprising layer 1 and layer 2, each of said layers characterized as comprising a layer thickness $d_1$ and $d_2$, and comprising a effective permittivity $\in_1$ and $\in_2$ at a wavelength $\lambda$, respectively, wherein said metamaterial crystal is characterized as having a unit cell of thickness d, wherein $c_1 = d_1/d$ and $c_2 = d_2/d$, wherein d is smaller than the wavelength $\lambda$, wherein $c_1$ and $c_2$ are coefficients and wherein $\in_1$ and $\in_2$ are characterized according to the relationship $$\in_2 \cong -(c_1/c_2)\in_1;$$

an input surface adjacently situated to at least one of said alternating layers of said metamaterial crystal, and an output surface adjacently situated to at least one of said alternating layers of said metamaterial crystal;

placing an object adjacent to said input surface of the FaSDOL;

transmitting an image from said object adjacent to the input surface into a metamaterial crystal of the FaSDOL; and transmitting a magnified image out of the FaSDOL.

* * * * *